United States Patent
Orlosky

(10) Patent No.: US 7,385,524 B1
(45) Date of Patent: Jun. 10, 2008

(54) AUTOMATED METER READING, BILLING AND PAYMENT PROCESSING SYSTEM

(76) Inventor: James Robert Orlosky, 18452 Wisecarver T.T., Jamul, CA (US) 91935

( * ) Notice: Subject to any disclaimer, the term of this patent is extended or adjusted under 35 U.S.C. 154(b) by 674 days.

(21) Appl. No.: 10/380,940

(22) PCT Filed: Sep. 21, 2000

(86) PCT No.: PCT/US01/29583

§ 371 (c)(1),
(2), (4) Date: Mar. 19, 2003

(87) PCT Pub. No.: WO02/25987

PCT Pub. Date: Mar. 28, 2002

(51) Int. Cl.
*G08C 17/00* (2006.01)
*G08C 15/06* (2006.01)
*G01T 1/16* (2006.01)

(52) U.S. Cl. .................. 340/870.28; 340/870.02; 250/302

(58) Field of Classification Search ............ 340/870.01, 340/870.02, 870.03, 870.28; 250/356.1, 250/356.2, 302; 73/861.05, 861.77, 861.06; 705/412, 413; 235/94 R, 94 A
See application file for complete search history.

(56) References Cited

U.S. PATENT DOCUMENTS

| | | | |
|---|---|---|---|
| 3,531,771 A | 9/1970 | Jaxheimer et al. | |
| 3,676,875 A | 7/1972 | Adams et al. | |
| 3,688,271 A | 8/1972 | Rouse | |
| 3,688,292 A | 8/1972 | Snively | |
| 3,691,547 A | 9/1972 | Lipscomb | |
| 3,697,970 A | 10/1972 | Jaxheimer | |
| 3,705,385 A | 12/1972 | Batz | |
| 3,737,858 A | 6/1973 | Turner et al. | |
| 3,815,119 A | 6/1974 | Finlay, Jr. et al. | |
| 3,826,868 A | 7/1974 | Nugent | |
| 3,842,670 A * | 10/1974 | Brain | 73/861.05 |
| 3,899,639 A | 8/1975 | Cheveley et al. | |
| 3,900,842 A | 8/1975 | Calabro et al. | |
| 3,914,757 A | 10/1975 | Finlay, Jr. et al. | |
| 3,922,490 A | 11/1975 | Pettis | |

(Continued)

FOREIGN PATENT DOCUMENTS

JP       357093272 A  *  6/1982

OTHER PUBLICATIONS

Review of Site-Characterization Technologies (http://www.geog.ucsb.edu/-renehan/epa_article/techs.html).*

*Primary Examiner*—Igor N Borissov
(74) *Attorney, Agent, or Firm*—Kenyon & Kenyon LLP

(57) ABSTRACT

The present invention includes an automatic commodity or services billing and metering system that when installed does not damage any existing meters or gauges, will fit virtually all known meters and gauges, and has incorporated into the system programmable reading ability to allow reading and accumulation of data by unit, hourly, daily, weekly, monthly or any other form of counting required by the customer. The meters are read by various means, one method is by counting and or sensing radiation increases and decreases of radiation emitting from a meter hand or gauge passing a sensor to generate a count. The read data is then sent via the Internet through the telephone line, by satellite, or by cellular phone connection to an offsite central billing and payment processing center where the rate payer and the utility or customer will have various forms of programmable access to its consumption data.

5 Claims, 10 Drawing Sheets

U.S. PATENT DOCUMENTS

| | | | |
|---|---|---|---|
| 3,924,224 A | 12/1975 | Dyer | |
| 3,965,739 A * | 6/1976 | Jones | 73/861.05 |
| 4,008,458 A | 2/1977 | Wensley | |
| 4,010,708 A * | 3/1977 | Keledy et al. | 250/358.1 |
| 4,035,646 A * | 7/1977 | Krisst | 250/356.2 |
| 4,035,772 A | 7/1977 | Abe et al. | |
| 4,119,948 A | 10/1978 | Ward et al. | |
| 4,135,181 A | 1/1979 | Bogacki et al. | |
| 4,213,119 A | 7/1980 | Ward et al. | |
| 4,254,472 A | 3/1981 | Juengel et al. | |
| 4,316,262 A | 2/1982 | Mizuta et al. | |
| 4,361,838 A | 11/1982 | Mizuta | |
| 4,396,915 A | 8/1983 | Farnsworth et al. | |
| 4,449,400 A * | 5/1984 | Singh | 73/170.15 |
| 4,483,199 A * | 11/1984 | Beiermann et al. | 73/861.04 |
| 4,642,635 A | 2/1987 | Snaper | |
| 4,652,877 A | 3/1987 | Gray | |
| 4,654,662 A | 3/1987 | Van Orsdel | |
| 4,804,957 A | 2/1989 | Selph et al. | |
| 4,811,011 A | 3/1989 | Sollinger | |
| 4,817,131 A | 3/1989 | Thornborough et al. | |
| 4,833,618 A | 5/1989 | Verma et al. | |
| 4,850,010 A | 7/1989 | Stanbury et al. | |
| 4,918,313 A * | 4/1990 | Dubail et al. | 250/356.2 |
| 4,940,976 A | 7/1990 | Gastouniotis et al. | |
| 4,974,245 A * | 11/1990 | Mioque et al. | 378/54 |
| 5,053,766 A | 10/1991 | Ruiz-del-Portal et al. | |
| 5,111,407 A | 5/1992 | Galpern | |
| 5,194,860 A | 3/1993 | Jones et al. | |
| 5,278,551 A | 1/1994 | Wakatsuki et al. | |
| 5,283,572 A | 2/1994 | McClelland et al. | |
| 5,311,581 A | 5/1994 | Merriam et al. | |
| 5,438,329 A | 8/1995 | Gastouniotis et al. | |
| 5,451,938 A | 9/1995 | Brennan, Jr. | |
| 5,481,259 A | 1/1996 | Bane | |
| 5,493,287 A | 2/1996 | Bane | |
| 5,495,238 A * | 2/1996 | Baker et al. | 340/870.02 |
| 5,594,431 A | 1/1997 | Sheppard et al. | |
| 5,619,192 A | 4/1997 | Ayala | |
| 5,631,636 A | 5/1997 | Bane | |
| 5,673,331 A | 9/1997 | Lewis et al. | |
| 5,684,472 A | 11/1997 | Bane | |
| 5,719,564 A | 2/1998 | Sears | |
| 5,748,104 A | 5/1998 | Argyroudis et al. | |
| 5,767,790 A | 6/1998 | Jovellana | |
| 5,801,643 A | 9/1998 | Williams et al. | |
| 5,831,550 A | 11/1998 | Sigiliao Da Costa et al. | |
| 5,870,140 A | 2/1999 | Gillberry | |
| 5,959,550 A | 9/1999 | Giles | |
| 5,963,146 A | 10/1999 | Johnson et al. | |
| 5,986,573 A | 11/1999 | Franklin et al. | |
| 5,986,574 A | 11/1999 | Colton | |
| 5,994,892 A | 11/1999 | Turino et al. | |
| 5,995,601 A | 11/1999 | Garland et al. | |
| 6,011,263 A * | 1/2000 | Bielski et al. | 250/356.1 |
| 6,020,830 A | 2/2000 | Gannon et al. | |
| 6,069,571 A | 5/2000 | Tell | |
| 6,073,169 A | 6/2000 | Shuey et al. | |
| 6,088,659 A | 7/2000 | Kelley et al. | |
| 6,115,677 A | 9/2000 | Perthold et al. | |
| 6,124,806 A | 9/2000 | Cunningham et al. | |
| 6,137,423 A | 10/2000 | Glorioso et al. | |
| 6,150,955 A | 11/2000 | Tracy et al. | |
| 6,163,276 A | 12/2000 | Irving et al. | |
| 6,172,616 B1 | 1/2001 | Johnson et al. | |
| 6,208,266 B1 | 3/2001 | Lyons et al. | |
| 6,216,543 B1 * | 4/2001 | Colin | 73/861.05 |
| 6,246,677 B1 | 6/2001 | Nap et al. | |
| 6,335,959 B1 * | 1/2002 | Lynch et al. | 378/45 |
| 6,351,223 B1 | 2/2002 | DeWeerd et al. | |
| 6,369,719 B1 | 4/2002 | Tracy et al. | |
| 6,373,399 B1 | 4/2002 | Johnson et al. | |
| 6,425,343 B1 * | 7/2002 | Akers et al. | 116/216 |
| 6,452,505 B1 | 9/2002 | Taglionki | |
| 6,477,386 B1 | 11/2002 | Giles | |
| 6,538,577 B1 | 3/2003 | Ehrke et al. | |
| 6,653,945 B2 | 11/2003 | Johnson et al. | |
| 6,657,552 B2 | 12/2003 | Belski et al. | |
| 6,674,371 B1 | 1/2004 | Oliver et al. | |
| 6,710,721 B1 | 3/2004 | Holowick | |
| 6,737,984 B1 | 5/2004 | Welles, II et al. | |
| 6,737,985 B1 | 5/2004 | Garrard et al. | |
| 6,747,981 B2 | 6/2004 | Ardalan et al. | |
| 6,856,257 B1 | 2/2005 | Van Heteren | |
| 6,891,838 B1 | 5/2005 | Petite et al. | |
| 6,900,738 B2 | 5/2005 | Crichlow | |
| 6,933,857 B2 | 8/2005 | Foote | |
| 6,947,854 B2 | 9/2005 | Swarztrauber et al. | |
| 6,954,814 B1 | 10/2005 | Leach | |
| 6,965,319 B1 | 11/2005 | Crichlow | |
| 6,982,651 B2 | 1/2006 | Fischer | |
| 6,985,087 B2 | 1/2006 | Soliman | |
| 6,996,215 B2 | 2/2006 | MacConnell | |
| 7,009,530 B2 | 3/2006 | Zigdon et al. | |
| 7,012,546 B1 | 3/2006 | Zigdon et al. | |
| 7,042,368 B2 | 5/2006 | Patterson et al. | |
| 7,043,459 B2 | 5/2006 | Peevey | |
| 2001/0038342 A1 | 11/2001 | Foote | |
| 2002/0030604 A1 | 3/2002 | Chance et al. | |
| 2002/0041237 A1 | 4/2002 | Nathan | |
| 2002/0163442 A1 | 11/2002 | Fischer | |
| 2003/0016142 A1 | 1/2003 | Holmes et al. | |
| 2003/0034900 A1 | 2/2003 | Han | |
| 2003/0048199 A1 | 3/2003 | Zigdon et al. | |
| 2003/0058129 A1 | 3/2003 | Kim | |
| 2003/0076241 A1 | 4/2003 | Middleton | |
| 2003/0076242 A1 | 4/2003 | Burns et al. | |
| 2003/0156041 A1 | 8/2003 | Taisto et al. | |
| 2003/0174067 A1 | 9/2003 | Soliman | |
| 2004/0027253 A1 | 2/2004 | Marsh et al. | |
| 2004/0066310 A1 | 4/2004 | Ehrke et al. | |
| 2004/0070517 A1 | 4/2004 | Ehrke et al. | |
| 2004/0113810 A1 | 6/2004 | Mason, Jr. et al. | |
| 2004/0174270 A1 | 9/2004 | Choi | |
| 2004/0174271 A1 | 9/2004 | Welles, II et al. | |
| 2004/0239522 A1 | 12/2004 | Gallagher | |
| 2004/0243524 A1 | 12/2004 | Crichlow | |
| 2004/0263352 A1 | 12/2004 | Cornwall et al. | |
| 2005/0012639 A1 | 1/2005 | Smit | |
| 2005/0035877 A1 | 2/2005 | Kim | |
| 2005/0065743 A1 | 3/2005 | Cumming et al. | |
| 2005/0068193 A1 | 3/2005 | Osterloh et al. | |
| 2005/0068194 A1 | 3/2005 | Schleich et al. | |
| 2005/0110656 A1 | 5/2005 | Patterson et al. | |
| 2005/0122233 A1 | 6/2005 | Isoyama et al. | |
| 2005/0179561 A1 | 8/2005 | Osterloh et al. | |
| 2005/0184882 A1 | 8/2005 | Angelis et al. | |
| 2005/0190074 A1 | 9/2005 | Cumeralto et al. | |
| 2005/0195078 A1 | 9/2005 | Basinger et al. | |
| 2005/0225455 A1 | 10/2005 | Patterson et al. | |
| 2005/0246295 A1 | 11/2005 | Cameron | |
| 2005/0270173 A1 | 12/2005 | Boaz | |
| 2006/0007016 A1 | 1/2006 | Borkowski et al. | |
| 2006/0012491 A1 | 1/2006 | Mahowald | |
| 2006/0022841 A1 | 2/2006 | Hoiness et al. | |
| 2006/0028355 A1 | 2/2006 | Patterson et al. | |
| 2006/0044158 A1 | 3/2006 | Womble et al. | |
| 2006/0066457 A1 | 3/2006 | Mueller et al. | |
| 2006/0071811 A1 | 4/2006 | Christopher et al. | |
| 2006/0071812 A1 | 4/2006 | Mason, Jr. et al. | |
| 2006/0091877 A1 | 5/2006 | Robinson et al. | |
| 2006/0097892 A1 | 5/2006 | Zigdon et al. | |

\* cited by examiner

AUTOMATED METER READING, BILLING AND PAYMENT PROCESSING SYSTEM

BACKGROUND OF THE INVENTION

1. Technical Field

The present invention generally relates to meter reading systems. More particularly, the invention relates to an automated approach to meter reading, billing and payment processing that reduces retrofitting costs, increases functionality and enhances performance.

2. Discussion

In the utility industry, recent difficulties associated with deregulation have placed a premium on cost reduction and automation. In particular, the complexity of conventional billing processes has placed meter reading approaches and systems under heightened scrutiny. In fact, the majority of utility companies still rely upon a manual meter reading approach that involves a significant labor cost, invoicing delay and equipment costs. While some companies have opted to reduce the frequency of meter reading and estimate commodity usage during interim periods, such an approach lends itself to uncertainty and adds risk to the overall operation.

While a number of approaches to automating the meter reading process have been made, certain difficulties remain. For example, most conventional automation approaches require meter replacement or a complex retrofitting process. With the hundreds of millions of meters currently in service, it is easy to understand that the associated costs make these approaches impractical in a modern economy. It is therefore desirable to provide a method and system that streamline the billing process while at the same time reduce operating costs and enhance performance.

SUMMARY OF THE INVENTION

The Electronic Meter Reader System of one embodiment of the present invention includes an automatic commodity or services billing and metering system that, when installed does not damage any existing meters or gauges, will fit virtually all known meters and gauges, and has incorporated into the system programmable reading ability to allow reading and accumulation of data by metered unit, hourly, daily, weekly, monthly or any other form of counting required by the customer.

The meters equipped with the reader system may be read by various means. For example, one method is by counting and or sensing radiation increases and decreases of radiation emitting from a hand or gauge passing a sensor to generate a count. Another system to read meters or gauges is the use of an interface to receive the data from LED or LCD displays. The third system in reading meters or gauges is the CMOS reader that sends an image to a computer like a fax is transmitted, for subsequent deciphering of the image to numbers or counts.

The system of one embodiment of the present invention is a significant improvement over traditional magnetic reading systems because the radiation element in the embodiment can be sensed through metal, glass and plastic, and is always accurate regardless of environmental variances. More importantly, the system is significantly more difficult to tamper with, as a user cannot simply add a neodymium magnet to the surface to destroy the reading ability, as is commonly done in magnetic reading or inductive reading devices.

The meter read process device of one embodiment of the present invention is part of the billing and meter process system, and is located within a radio frequency transmission distance of the meter reader. The meter reader communicates directly with the process device and provides the data required to be sent to the billing system by telephone or satellite.

A digital transceiver operating in accordance with a commercially available protocol such as CDMA, TDMA, etc., is included in both the process and meter reading device, and provides for the exchange of information via a wireless data communication channel. As is well know in the prior art, the CDMA communication technology provides for thousands of frequencies to be used in varying amplification between 46 MHz. to 2.7 Ghz, and may be encrypted thereby providing absolute security for reading and processing information.

One of the most important elements of the billing and meter reader system of the present invention is the Internet access billing and payment collection system. Located at a remote location, thousands of miles away, is a high speed billing computer system and Internet server that gathers information from millions of customers. The billing system allows the rate payer and utilities or commodity owners to have access to various data effecting their accounts.

The information available for the rate payer is use, billing and payment history and the rate payer has the ability to authorize payment, via the Internet, to pay for services rendered and or commodities purchased. The rate payer need only send information to the billing system to authorized payment, such as a bank account or credit card, to allow the billing system to debit the rate payers bank account or charge a credit card. If the rate payer elects to use the Internet payment system, the rate payer and the utility or commodity owner will share in the savings from not using the postal system. Further, the billing system allows the utility or commodity owner to gain access to its account information such as, total collected by hour, day or month and to access various preprogrammed quantity information schedules such as product draw per line or spread sheets for payment and sales history.

An important improvement in the present invention is the ability of the system to stand on its own as a complete reading, billing and collection systems whereby, once the system is installed, there is no need for the utility or commodity supplier to drive by or inspect the meter reading system, or to take data by rolling data collection trucks. Furthermore, the customer has the additional advantage of being able to pay for all metered services and products on-line, via the Internet. The commodity suppliers and utility companies need not own and operate billing and collection centers, the system is all inclusive under a "stand alone" real time approach, and the system is user friendly. The system has programmable variables that can be installed in the reader, process system and billing and collection system. These programmable features allow the company to program trouble codes into the system to identify faults that may be transmitted from the meter reader during the ordinary retrieval of consumption information.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF THE DRAWINGS

The nature, objects, and advantages of the present invention will become more apparent to those skilled in the art after considering the following detailed description in connection with the accompanying drawings, in which like reference numerals designate like parts throughout, and wherein.

DETAILED DESCRIPTION OF THE PREFERRED EMBODIMENTS

Figure 1:
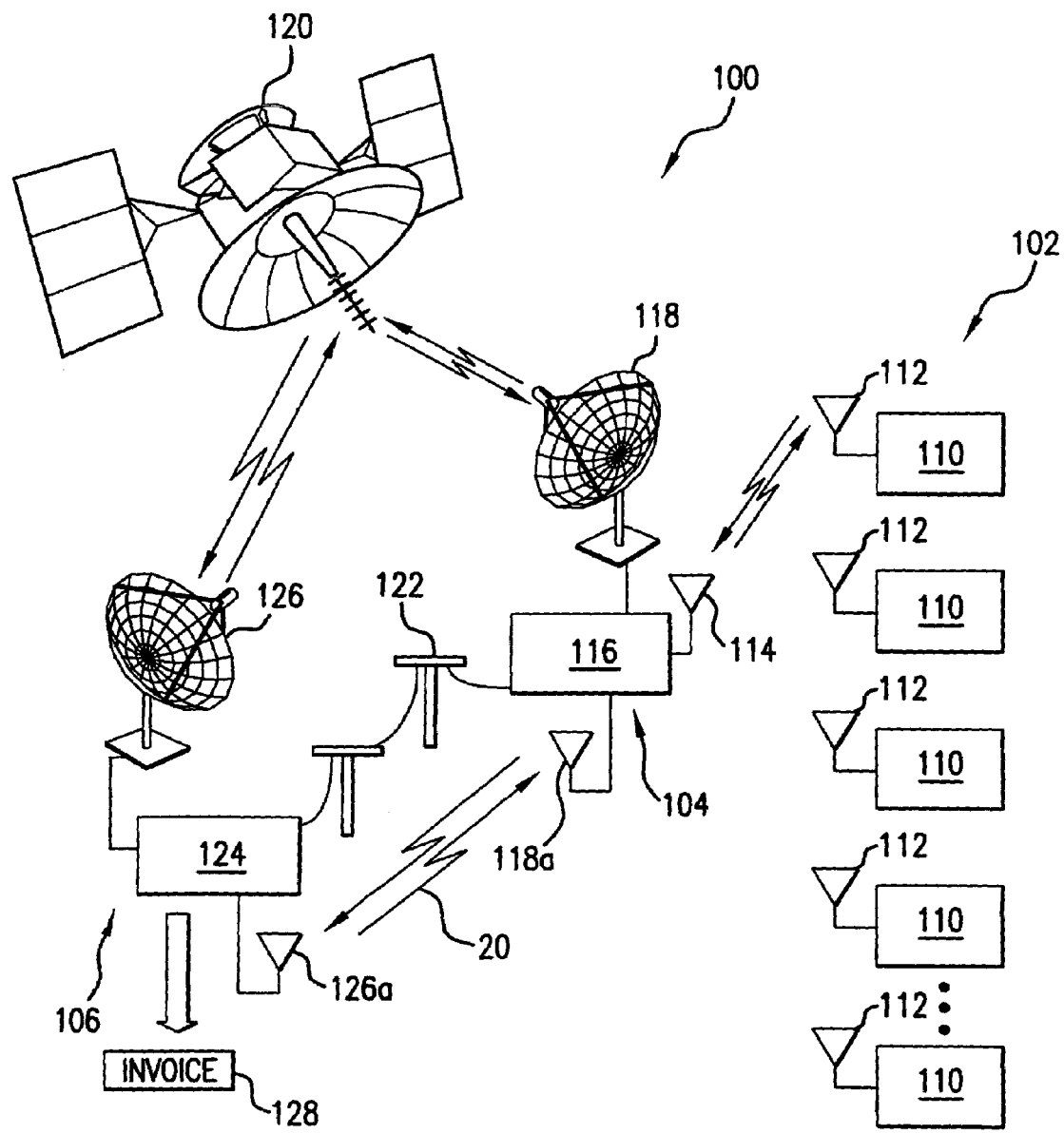
FIG. 1 is a schematic representation of the system of the present invention, showing multiple meter reading devices, a communication hub, and a central billing station.

The present invention has the capability to provide billing services to the rate payer, or customer, and the utility, or commodity supply companies, that have never been provided in the past. These services include the ability of all the parties to have interactive access to their respective account information and arrange payment or obtain use information on-line, using the Internet.

The present invention also provides the commodity supplier or utility companies with the ability to access their respective customer accounts in a variety of programmed formulas that provide data in multiple use summaries to monitor current use, plan for future infrastructure expansion and add and subtract customers as business warrants. Also, the ability to instantaneously determine the current commodity consumption throughout service areas, regions, or even specific distribution channels, such as electrical grids, provides the commodity supplier with the information necessary to ensure the highest quality of service. Moreover, the instantaneous measurement of the consumption, and the ability to analyze by time period the prior consumption rates, provides information useful to commodity supplier for future development, expansion, or upgrading its distribution systems.

Because all commodity suppliers can use the system of the present invention, the billing system can invoice a customer for all utilities on single invoice, and thus saves postage and mailing cost associated with billing and receiving payments from multiple commodity suppliers, as is the conventional manner today. These cost savings can be passed on to the consumer and the supplier. Since there are billions of meters that require billing and reading each day, week or month, the savings to customer and suppliers can be enormous if such a system is offered.

The read system has the ability to read actual use of commodities such as water, gas, crude oil, chemicals, or electrical energy by unit, hour, day and or month, as so programmed at the request of the utility, supplier, rate payer or customer. The meter reader may use any of three distinct reading approaches. One approach involves the use of a radioactive sensor that reads a meter hand as the hand rotates around a conventional meter or moves on a meter scale or dial. Another approach involves reading information from a numeric display, using CMOS visual reading that is sent to a computer for analysis. The display information can be processed at an off site computer, which deciphers the image to numbers. The last method involves reading LED or LCD display numbers by connecting the output of the display to a sending unit.

The overall system has a process system that receives data transmitted in various ways from the read system. Transmission of data can be sent via hardwire connection or by radio transmission. The reader will send to the processor the serial number of the meter, or other customer information, and the read or reads presently obtained from the meter. The process system accumulates real time information or passive information from the reader, as the customer so programs the reader, and the process system then sends the data directly to the billing computer, via the Internet. The process system has the ability to accept reads from many different types of readers at different times of the day and night and stores the information in its memory for future transmission through the Internet to the billing and collecting computer.

One embodiment involves the development and installation of a drop of premixed liquid resin, or adhesive, containing a radioactive material or compound that emits radiation at given rates over time after placement upon a meter or dial. Once the resin or adhesive is placed, the resin or adhesive dries hard and adheres to the meter hand, dial or tumbler.

A radioactive detection sensor detects the rise and fall of the radioactive emissions radiating from the radioactive substance within the meter as the hand or dial passes the detection sensor. In a preferred embodiment, this radioactive compound or material has a half-life of several decades in order to minimize the replacement and repair costs for meter reading devices in the present invention. It should be appreciated, however, that a shorter half-life is also useful and fully contemplated in the present invention. The detection sensor can be placed anywhere on the outside of the meter, and the changes in radioactive emissions received by the sensor will be registered by a counter each time the hand or dial moves past a designated point, without retrofitting the meter. When radioactive detection is used, the radioactive emissions pass directly through metal, glass or plastic without damaging the meter.

The invention also provides for the installation of a variable quantity radioactive sensing device that detects an increase or decrease in radioactive emissions in order to read a scale measurement or pressure gauge. This is achieved by placing a radioactive emission reading sensor at an angle to the movement of the meter hand. Once the sensor is placed on an angle to the meter hand, the meter can be read by the variation of radiation received. The number or quantity of emissions is read by offsetting the collecting sensor in various degrees that vary perpendicular to the meter hand, dial, or gauge hand. A computer program can provide data conversion by converting the emission rate to counts, counts over specific time frame, or as required by the customer.

A radioactive detection sensor can detect the rise and fall of the radioactive emissions radiating from the meter hand as the hand passes the detection sensor. The detection sensor, can be placed anywhere on the outside of the meter and the changes in radioactive emissions received by the sensor are registered in a counter each time the hand or dial is detected moving around the meter, without retrofitting the meter.

A radio frequency (RF) based communication system includes a transmitting signal comprising of an external power source or external solar powered source, a battery back up, and utilizes a digital transmission and receiving technology known in the art to transmit and receive data generated by the meter reader system, within radio transmission distance. The data transmitted from the meter reader may include the actual count data of the meter at the time of transmission, the serial number of the meter and customer information as may be stored in local memory. The receiver receives the counts of the meter by units, hours, days, and or months, stores the count information in its internal memory, and then sends count data to the process system as preprogrammed by the customer.

The RF communication system described includes a microprocessor and a digital communication system, such as a modem, and a process system that sends count data collected from the meter reader through the telephone land line, cellular telephone communication channel, satellite communication channel, or the Internet, to a central billing and payment processing computer without the use of a mobile node or movable data collection equipment. Because each meter reader is preferably self-powered, power outages do not effect the system.

The metering, communication and billing and collection system of the present invention supports multiple meter readers, attached to virtually any meter or gauge, and counts by units, hours, days, dates and or months, as preprogrammed at the customers choice.

The use of an Internet server to obtain data sent from the process system provides for the exchange of information using a standard information protocol, such as TCP/IP. The server may be programmed to obtain and store the meter information required from each reporting meter process system, and then download the information to the billing and collecting computer system upon demand. The server allows the collection of data at a much greater rate than is achievable under conventional meter reading and downloading technologies.

The meter reader of the present invention is programmable and shall alert the process system with trouble codes defining events such as, but not limited to, low battery, reporting collected data irregularity, power outages or supply limitations, or other conditions affecting the distribution and consumption of the commodity.

The billing and collecting computer may also be programmable to allow the customer, known as the utility or commodity service or product provider, to have access to all collected usage information on their accounts. This information may include, but not be limited to, total consumption by customer, date, hour, day, week, month, year, branch or line of service, cumulative totals of products, or services, delivered in various retrieval forms. The billing and collecting computer shall permit the customer to retrieve financial data, such as payment history per account, date of billing, date of collection, type of payment made, such as on-line check debit, credit card, or check payment, and the system may also provide a variety of combinations of financial information as required by a specific customer.

The billing and collecting computer is programmable and allows the rate payer or secondary customer of the prime customer to have access to all collected information on their accounts. This information shall include, but not be limited to, totals by customer of all products and or services by unit, date, hour, day, week, month, year, cumulative totals of products, or services, delivered in various retrievable formats. The billing and collecting computer preferably permits the rate payer to retrieve a variety of financial data, such as payment history for the particular account, date of billing, date of collection, type of payment made, be it online check debit, credit card, or check payment, and the system shall provide a variety of other combinations of financial information as authorized to be released by the prime customer.

The rate payer, by using the Internet or by letter, can select his or her electrical or gas supplier if he or she discovers a more economical rate for the commodity being purchased. This is particularly useful in areas recently deregulated as the unit prices of various commodities fluctuate greatly, providing a significant financial incentive to the rate payer to identify and switch to the most inexpensive commodity supplier.

Referring now to FIG. 1, a schematic representation of the Electronic Meter Reader System (or meter management system) of the present invention is shown and generally designated 100. Electronic Meter Reader System 100 includes multiple meter reading devices 102 in wireless communication with a communication hub 104, which communicates usage information to central billing station 106.

Meter reading device 102 includes a meter reader unit 110 and an antenna 112. Each meter reader unit 110 is more thoroughly described in conjunction with FIG. 5 below.

Communication hub 104 receives a communication signal transmitted from antenna 112 of meter reader 110 via antenna 114. Once received by antenna 114, the communication hub computer 116 decodes the usage data from the transmitted signal and stores the usage data. Periodically, the communication hub computer 116 transmits the stored usage data to a central billing station 106. For instance, communication hub computer 116 may transmit the usage data via a satellite communication transceiver 118, to satellite 120, which in turn relays the usage data to satellite transceiver 126 on central billing station 106. This satellite communication link is particularly useful in installations of the Electronic Meter Reader System 100 where access to traditional wired communication systems such as telephone lines, is not available.

Alternatively, communication hub computer 116 may transmit the usage data via a telephone line 122, either by using a traditional modulator/demodulator (i.e., modem), or via an Internet communication protocol, such as TCP/IP, to the central billing station 124. It can further be seen that the communication hub computer 116 can transmit the usage data via an antenna 118a over a cellular telephone communication link 20 to a billing station antenna 126a. It should be noted that the communication link 20 includes various base stations and relay stations as necessary to complete the transmission. Once the central billing station 124 has received usage data for each, or a number of meter reading devices 102, a single invoice 128 is created. The invoice 128 can be either mailed to the consumer or sent to the consumer via the Internet, or the costs for the usage may be automatically debited from the consumer's financial accounts, as is fully set forth above.

Figure 2:
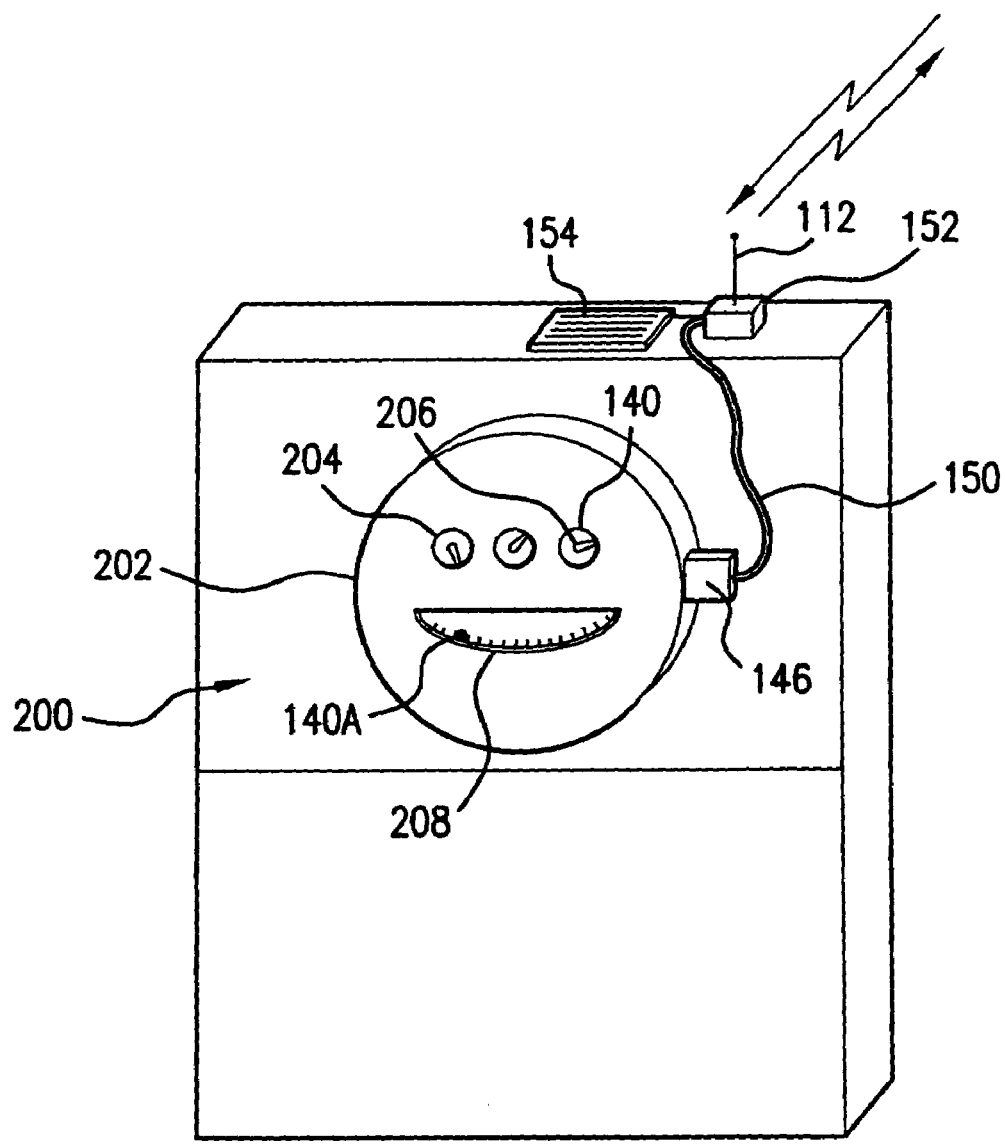
FIG. 2 is a typical electrical panel having an electric meter equipped with the meter reading device of one embodiment of the present invention.

Referring now to FIG. 2, a typical electrical panel is shown and generally designated 200. Electrical panel 200 includes an electric meter 202 having one or more dials 204 having a dial arm 206, and having a metering disc 208 which rotates in accordance with electricity usage through the electrical panel 200. Electrical panel 200 is also equipped with the meter reading device 102, including a sensor 146 attached to an exterior wall of the electrical meter 202. Sensor 146 is in electrical communication with meter reader circuitry 152, which derives its electrical power, in part, from solar cells 154. It should be noted that sensor 146 and circuitry 152 may be combined for space and cost saving considerations. Meter reading device 102 is also equipped with antenna 112 shown as a dipole antenna. However, it is to be appreciated that the particular design of the antenna 112 is merely exemplary, and that any other antenna known in the art for use with the frequencies involved is fully contemplated herein.

In accordance with the Electronic Meter Reader System of the present invention, dial arm 206 is equipped with a drop of resin containing a radioactive isotope. Alternatively, any moving part of a meter having a movement corresponding to the usage being metered, will suffice for use with the Electronic Meter Reader System of the illustrated embodiment of present invention. For instance, alternatively, a drop of radioactive resin 140A may be placed on metering disc 208. Once the radioactive resin is placed on a moving part of electric meter 202, sensor (or other input device) 146 will sense the relative strength of the tracking signal created by the radioactive material.

Unlike the currently available metering systems, the positioning of the radioactive resin is not critical as the reception of radioactive emanations by sensor 146 is significantly less affected by environmental variants, such as moisture, humidity, etc. Furthermore, radioactive emanations pass freely through most materials, even metallic meter covers, such that the Electronic Meter Reader System 100 can be applied to virtually all meters currently in use, including all electric, gas, and water meters.

Figure 3:
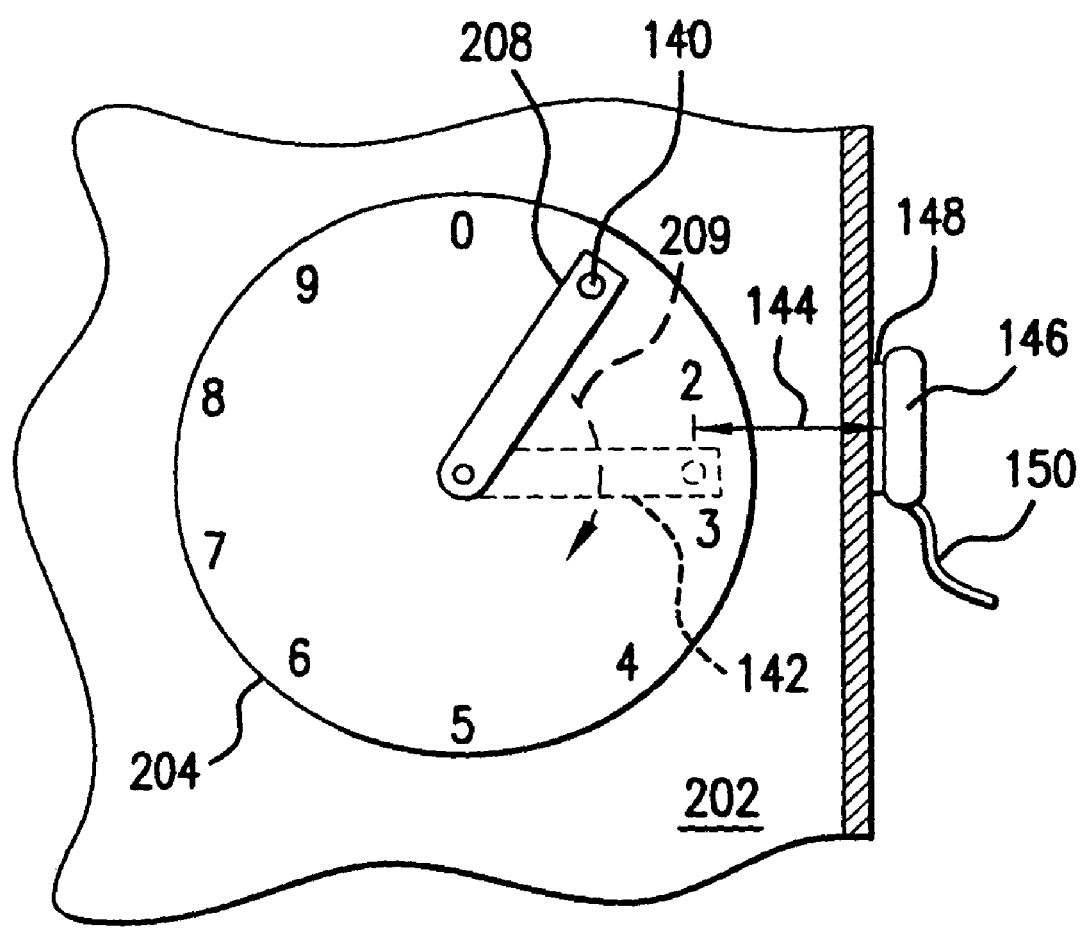
FIG. 3 is a detail view of a portion of the electric meter shown in FIG. 2, showing the placement of the radioactive resin and the location of the sensor head on the external surface of the electric meter.

Referring now to FIG. 3, a detailed view of a portion of the electric meter 202 is shown, further showing the placement of the radioactive resin 140 on dial arm 208, and the location of the sensor head 146 on the external surface of the electric meter 202. Sensor head 146 may be attached to the outer surface of the electric meter using adhesive 148, or any other means known in the art. As shown, when dial arm 208 rotates in direction 209, the distance between the radioactive resin 140 and sensor head 146 decreases until a minimum distance 144 is reached. When the radioactive resin 140 on dial arm 208 is a minimum distance 144 from sensor head 146, the radioactive tracking signal received by sensor head 146 is at a maximum value. As the dial arm 208 continues to rotate, the radioactive signal decreases until a minimum value of radioactive signal is received by the sensor head 146.

Figure 4:
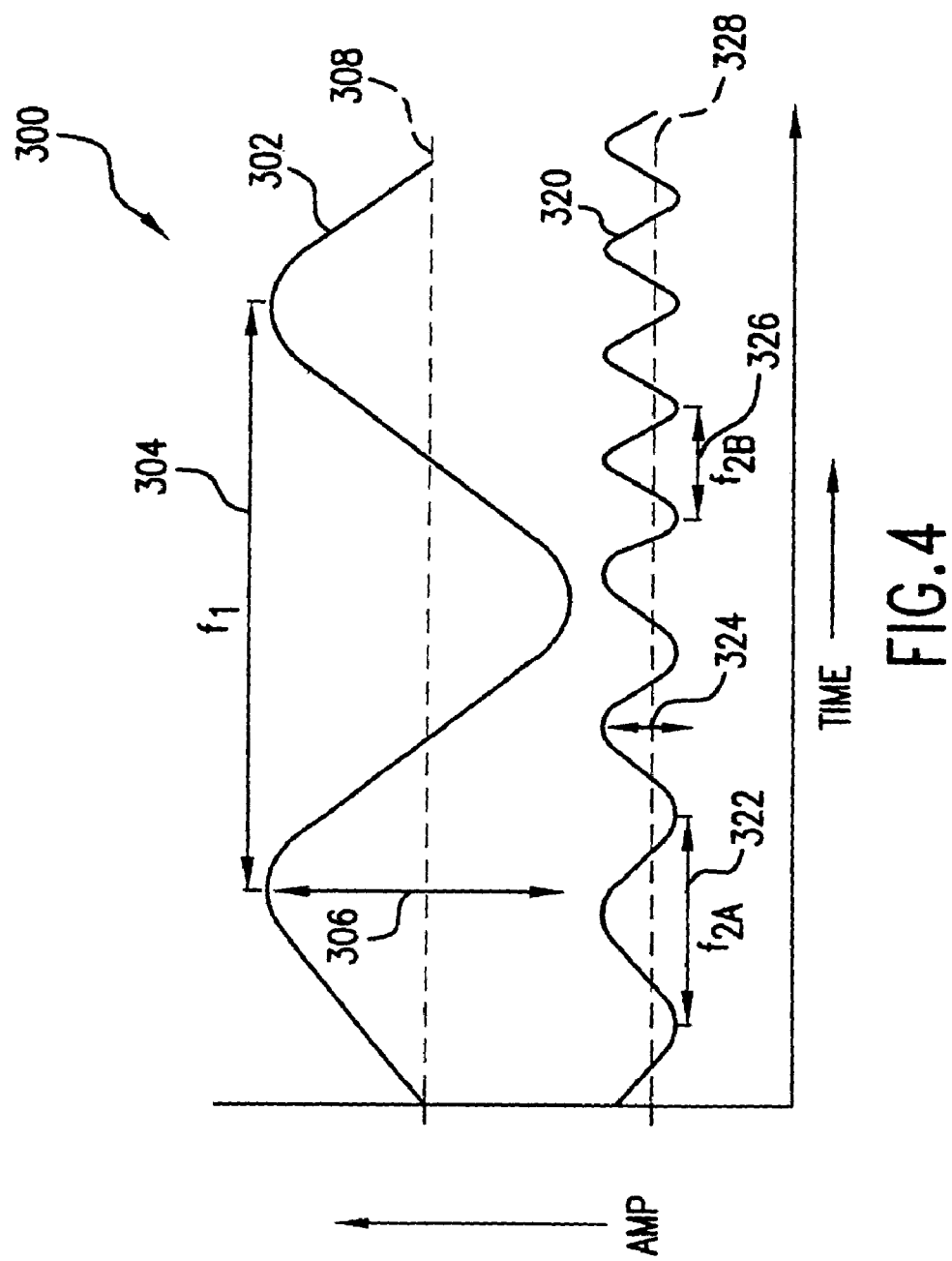
FIG. 4 is a graphical representation of the signal generated by the sensor head depicting two separate meter readings, showing differing periods, and having differing amplitude signals.

Referring to FIG. 4, a graphical representation of the signal generated by the sensor head depicting two separate meter readings, showing differing periods, and having differing amplitude signals is shown and generally designated 300. Graph 300 includes a first plot 302 having a period F1, designated 304, and an amplitude 306. The amplitude 306 represents a sensor head 146 in close proximity to the radioactive resin 140 at its closest position. Also, period 304 corresponds to a certain speed of rotation of dial arm 140.

In contrast, a second plot 320 is shown on graph 300 and has a first period F2A, designated 322, an amplitude 324, and a second period F2B, designated 326. As shown, second plot 320 has a smaller amplitude 324 than plot 302, and represents a sensor head 146 being mounted further away from radioactive resin 140, or a smaller quantity of strength of the radioactive resin 140. Also, the period 322 is somewhat shorter than period 304 of plot 302, signifying a faster rotational speed of dial arm 208. For illustrative purposes, plot 320, changes its period during the time interval shown to a second period 326, which is somewhat shorter than period 322, corresponding to a still more rapid rotation of the dial arm 208. The more rapid the rotation of the dial arm 208, the higher rate of consumption being measured by electric meter 202, or any other gas, water, or other meter.

Based on the rotation of the dial arm 208, the radioactive signal strength received by sensor head 146 may be analyzed to determine the number of rotations. This determination may be accomplished by integrating the electrical output of the sensor head 146 to determine a maximum value over a short time interval, or by establishing an average signal value, shown by dashed lines 308 and 328, and determining when the measured radioactive signal strength passes the established average value. Using these methods, the number of rotations of the dial arm 208 may be determined.

It should be noted that when a radioactive material is used, the isotope can be selected to provide virtually any half-life desired. For example, Cesium-137 has a half-life of 15 years. It should also be noted that the meter reading device can be readily designed to count rotations well beyond the half-life of the radioactive isotope. In fact, the photodetector, which typically generates a voltage based on the strength of sensed gamma rays, can be connected to a resistor-capacitor (RC) circuit or transistor that is designed to switch in response to decreases in gamma ray strength. Thus, as the radioactive material continues to decay the ability of the meter reading device to count rotations is only limited by the dynamic range of the photodetector.

Once the number of rotations of the dial arm 208 is determined, the consumption of the particular meter may be determined. For instance, if a single rotation of dial arm 208 corresponds to one-thousandth of a kilowatt hour, then the power consumption may be determined by counting the number of rotations, and multiplying that by the corresponding multiplier to determine consumption.

Figure 5:
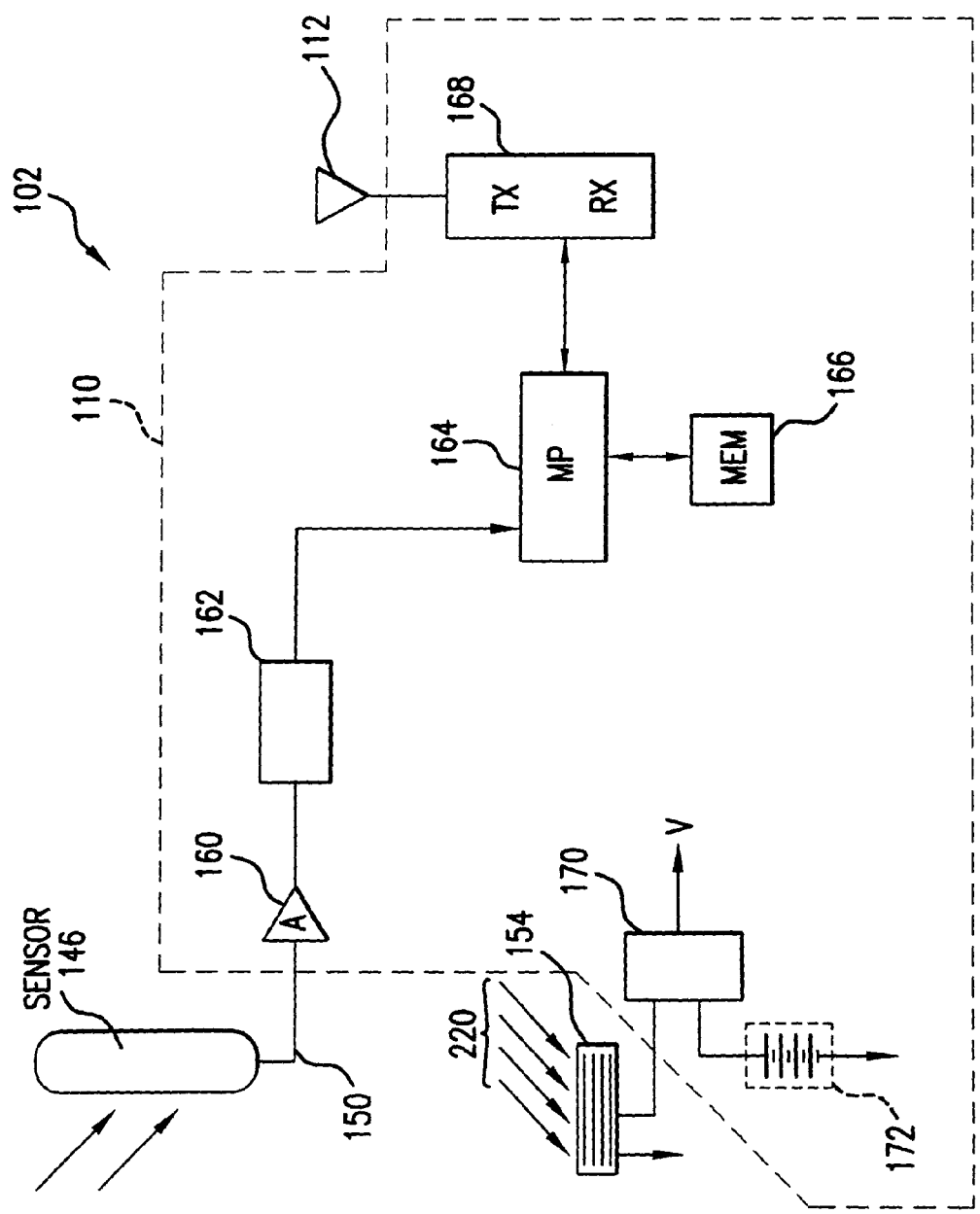
FIG. 5 is a block diagram representing the circuitry of a meter reading device of the present invention, including signal conditioning circuitry, a microprocessor, a transmitter/receiver, and a memory.

Referring now to FIG. 5, a block diagram representing the circuitry of the meter reading device 102 is shown and includes a meter reading unit 110, a radioactive sensor head 146, and a solar cell 154 for receiving solar radiation. Meter reading unit 110 receives an electrical signal 150 from sensor head 146 and amplifies and conditions that signal with amplifier 160 and 162, respectively. Once conditioned, microprocessor 164 captures the signal corresponding to the dial arm rotation and determines the usage data for that meter, which may be stored in digital memory 166.

Meter reading unit 110 may transmit the usage data via transmitter/receiver 168 and through antenna 112, as discussed above in conjunction with FIG. 1. Power for the operation of the meter reading device 102 may be derived from batteries 172, solar cells 154, hardwiring to the electrical service, the telephone system, inductively coupling necessary power from the electrical service, or a combination thereof. The power conditioning unit 170 regulates and manages the supply of power to the unit for transmitting and for storing the usage data.

Figure 6:
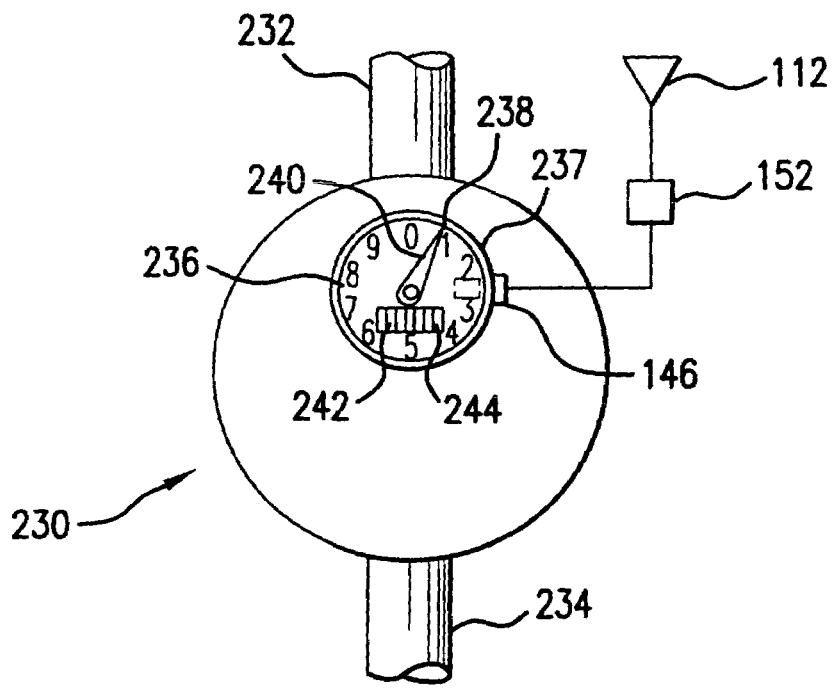
FIG. 6 is a typical water meter equipped with the meter reading device of one embodiment of the present invention.

Referring now to FIG. 6, a typical water meter is shown and generally designated 230. Water meter 230 is equipped with the meter reading device of the present invention and includes meter reader circuitry 152 attached to antenna 112, and in electrical connection with sensor head 146. Water meter 230 includes an inlet pipe 232 and an outlet pipe 234. Meter dial 236 includes a dial arm 238 equipped with a radioactive marker 240, such as the radioactive resin discussed above. Instead of dial 236, or in addition thereto, water meter 230 may be equipped with a decade rotating readout 242 having a number of decade readout wheels. One of the decade readout wheels, preferably the least significant digit, is also equipped with a radioactive marker. Sensor head 146 is attached to meter casing 237 such that the radioactive signal received by sensor head 146 varies as the position of dial arm 240 or decade wheel 242 changes, thereby providing the metering data necessary for use of the present invention.

It should be noted that water meters such as meter 230 are often surrounded by a concrete barrier such as a vault, or are buried under a sidewalk. The barrier therefore typically prevents light from striking the meter reading device. As a result, it is often difficult to deliver solar power to the meter reading device under conventional methods. One embodiment therefore provides a unique method of retrofitting such a meter with a solar cell. An opening is created in the concrete barrier by making a small saw cut, which is typically on the order of three to five square inches. The solar cell can then be electrically connected to the meter reading device such that the solar cell is able to provide power to the meter reading device based on light striking the solar cell. The process also provides for positioning the solar cell in a light-accessible location with regard to the opening. The opening is sealed with a clear, hardening resin such that the resin enables light to strike the solar cell.

Figure 7:
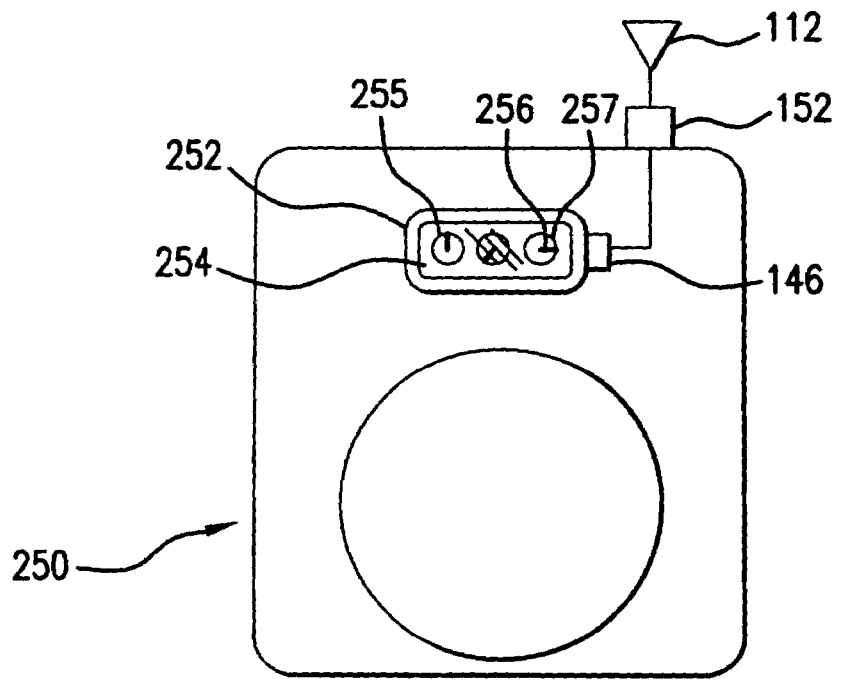
FIG. 7 is a typical gas meter equipped with the meter reading device of one embodiment of the present invention.

Referring now to FIG. 7, a typical gas meter is shown and designated 250. Meter 250 includes a display 252 having a bezel 254, often made of glass, and covering one or more dials 255, each having a dial arm 256 equipped with a radioactive marker 257. The sensor head 146 receives the radioactive signal from dial arm 256 and, as it rotates as discussed above, the signal varies to provide the necessary metering information and data for the present invention.

Figure 8:
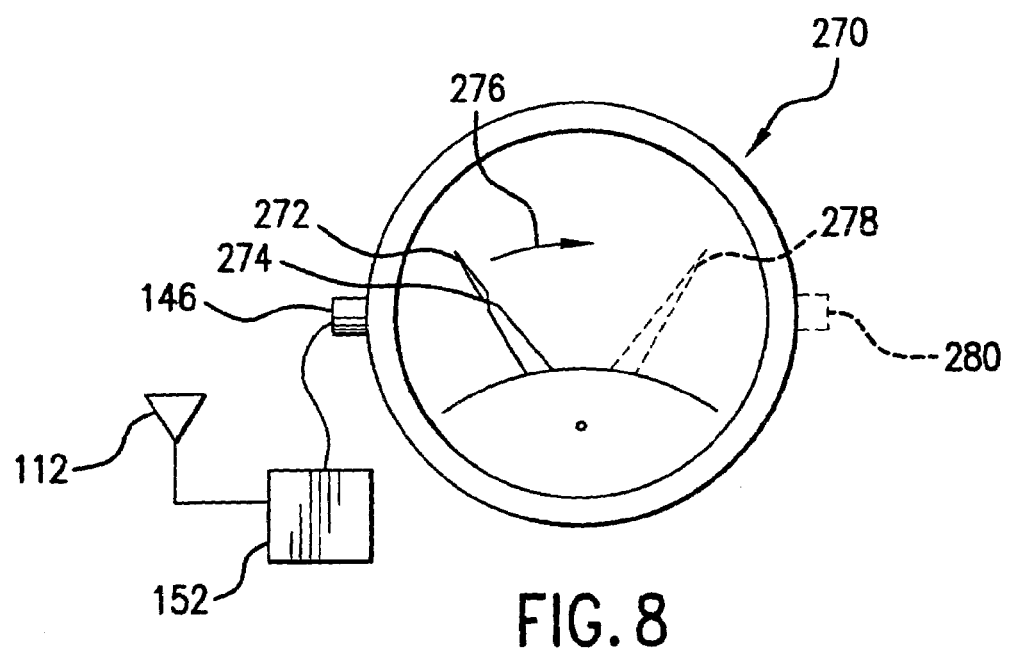
FIG. 8 is a typical gauge equipped with the meter reading device of one embodiment of the present invention.

Referring now to FIG. 8, a typical pressure gauge is shown and generally designated 270. Gauge 270 includes a gauge arm 272 having a radioactive marker 274 which, depending upon the pressure measured by the gauge, moves in direction 276 to a new position 278. A sensor head 146 is positioned the outside of gauge 270 to receive the radioactive signal produced by the radioactive marker 274, thereby determining the position of the gauge arm 272. Once the gauge is calibrated with the present invention, the relative pressure of the compressed air or other gaseous material can be determined, and thus, the necessary consumption data may be determined.

Figure 9:
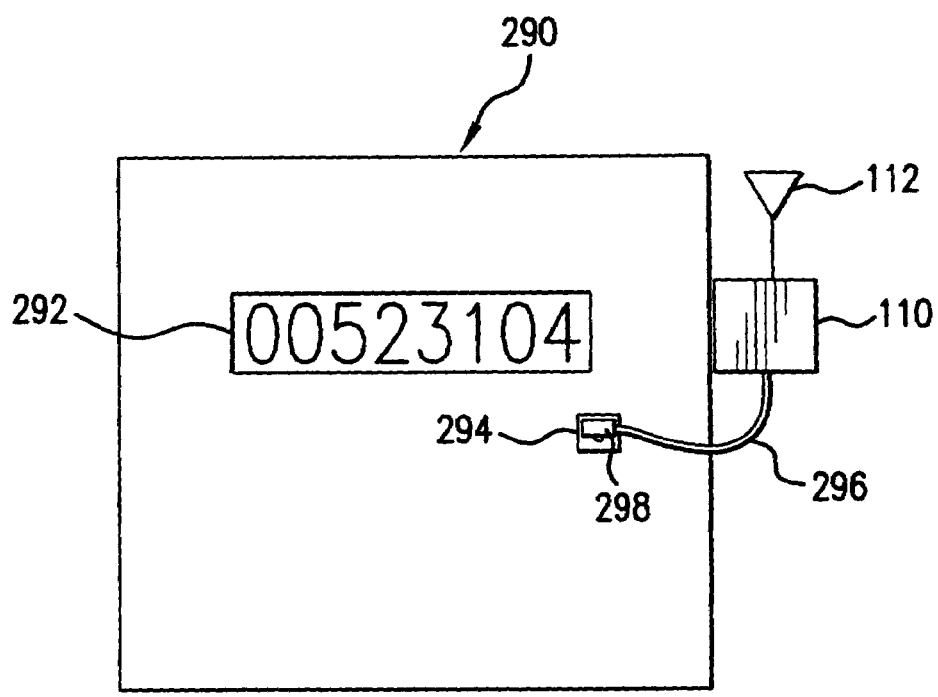
FIG. 9 is a diagrammatic representation of the meter reading device used in conjunction with the meter equipped with an RS232 or equivalent data port for receiving the consumption data from the meter directly.

Referring now to FIG. 9, a digital meter is shown and generally designated 290. Meter 290 includes a digital readout 292, such as a Light Emitting Diode (LED) display, or liquid crystal display (LCD), and a data output port, such as an RS232 data port. The meter reader circuitry 110 of the present invention may be equipped with a cable 296 having a corresponding mating plug 298 for engaging the output port 294 to receive the consumption data from the meter directly.

It should be noted that any of the meters described herein can be have a contrast sensing substrate placed over the display, where complementary metal oxide semiconductor (CMOS) sensing technology characterizes visual output from the display of the meter. CMOS imaging devices are described in a number of sources such as U.S. Pat. No. 6,287,886 to Pan.

Other Embodiments

Figure 10:
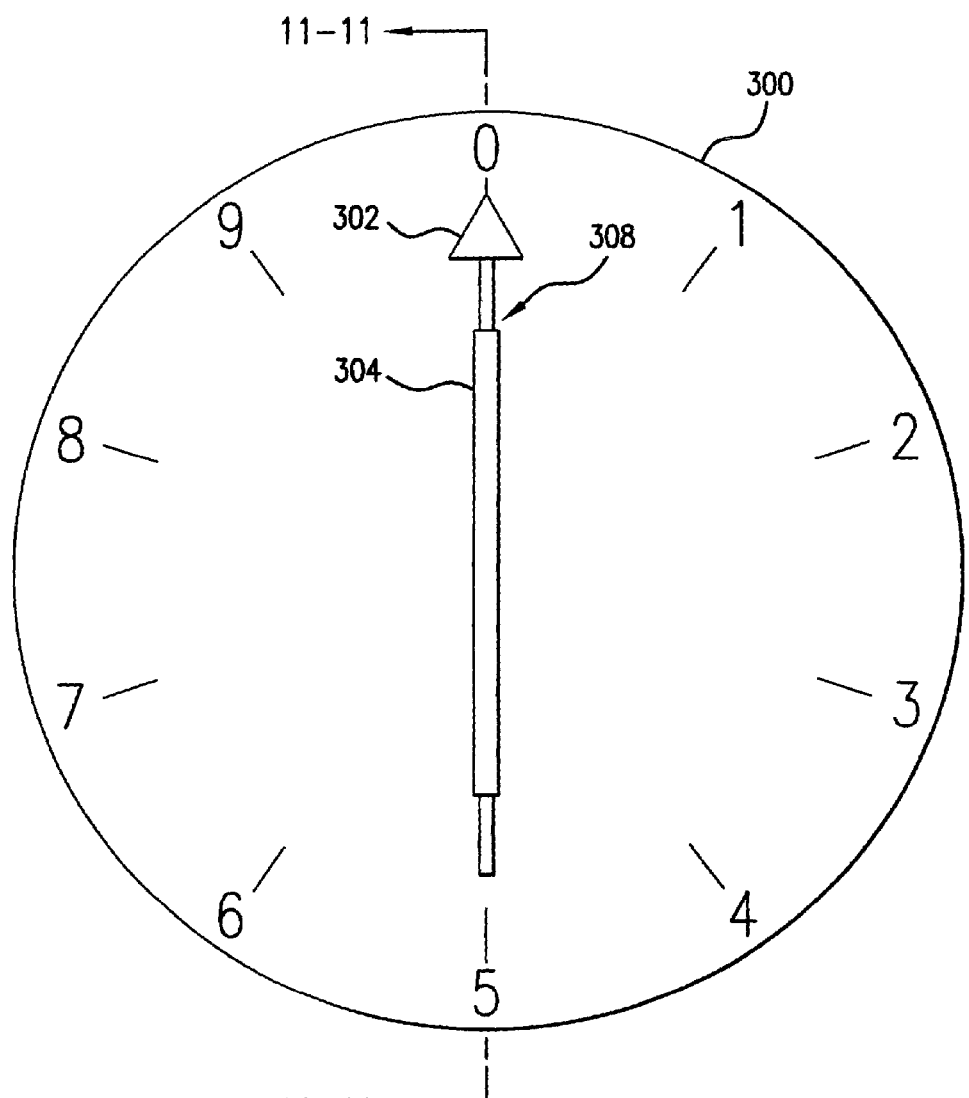
FIG. 10 is a front view of an example of a dial in accordance with an alternative embodiment of the present invention.
Figure 11:
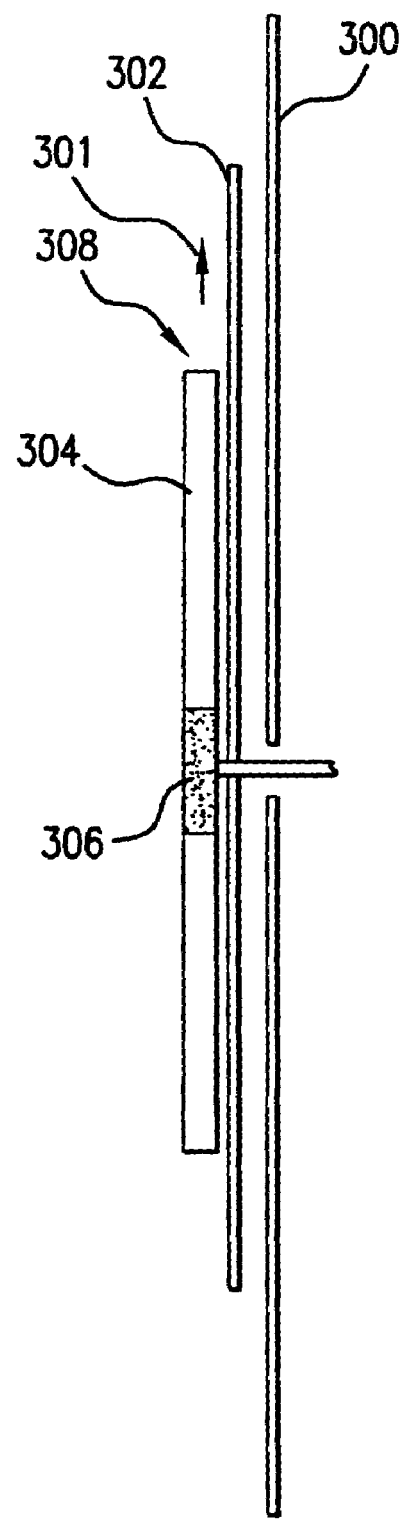
FIG. 11 is a sectional view of the dial shown in FIG. 10 taken along lines 11-11.

FIGS. 10-13 demonstrate that the present invention also provides a mechanism for limiting human exposure to emissions from the radioactive isotope. For example, FIG. 10 shows a meter 300 having a radiation shielding container 304 coupled to a dial 302 of the meter 300. As best seen in FIG. 11, a radioactive isotope 306 is disposed within the radiation shielding container 304, where the container 304 has surfaces defining an opening 308. The radioactive emissions 301 exit the container 304 through only the opening 308 and therefore can be provided with more directivity. It will be appreciated that human exposure can be further reduced by closing off the opening 308 until the desired meter retrofit is to be performed. At such time, the retrofit technician can use any acceptable punching or drilling device to create or expose the opening 308. It will further be appreciated that although the container 304 is illustrated as having a cylindrical geometry, other geometries such as spherical, conical, square cross-section, etc. are possible depending upon the circumstances. The container 304 is made of a radiation-resistant material such as lead.

Figure 12:
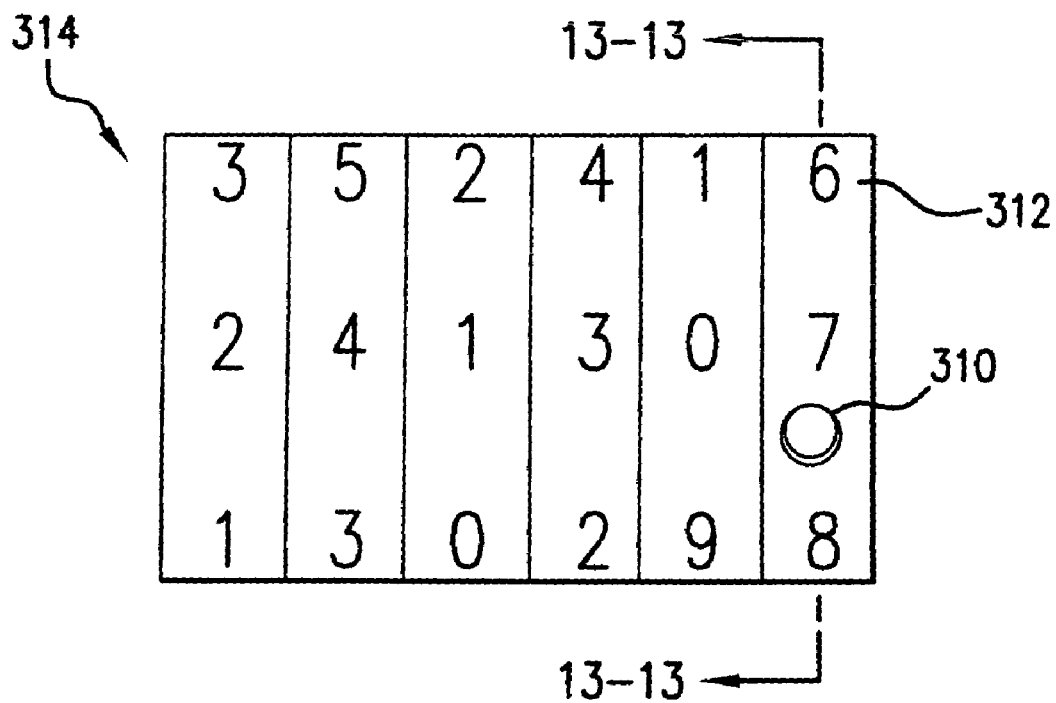
FIG. 12 is a front view of an example of a decade meter in accordance with an alternative embodiment of the present invention.
Figure 13:
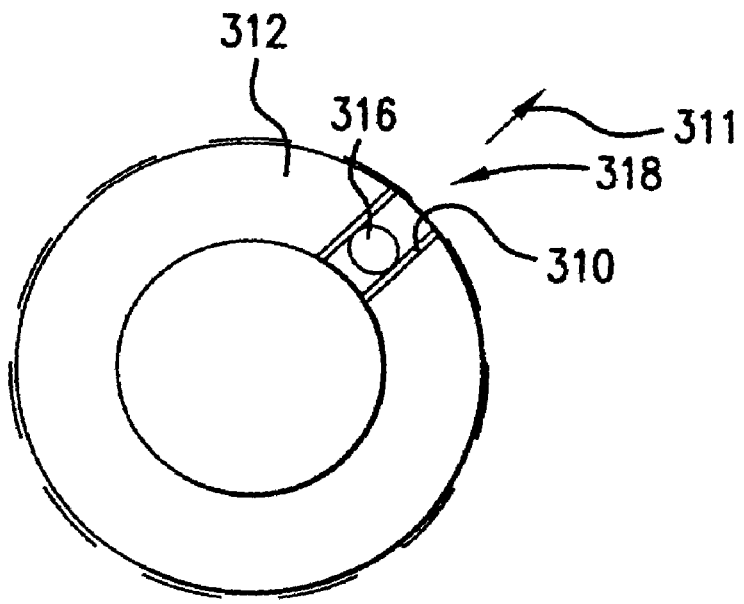
FIG. 13 is a sectional view of the decade meter shown in FIG. 12 taken along lines 13-13.

Turning now to FIGS. 12 and 13, a radiation shielding container 310 is shown, where the container 310 is coupled to a decade readout wheel 312 of meter 314. The radioactive isotope 316 directs radioactive emissions 311 through opening 318, which limits the effective exposure area as discussed above.

While there have been shown what are presently considered to be preferred embodiments of the present invention, it will be apparent to those skilled in the art that various changes and modifications can be made herein without departing from the scope and spirit of the invention.

We claim:

1. A utility meter reading device comprising:
   a sensor to generate a periodic input signal based on a commodity usage tracking signal, where the commodity usage tracking signal characterizes use of a commodity by a customer of a commodity provider;
   a processing module to generate usage data based on the periodic input signal and identification data corresponding to the meter;
   a transceiver operatively coupled to the processing module, the transceiver to condition the usage data for transmission;
   an antenna operatively coupled to the transceiver;
   a power supply to provide the reading device with a power signal; and
   a power conditioning unit operatively coupled to the power supply, the power conditioning unit conditioning the power signal for use in the reading device;

said sensor receiving the tracking signal from the meter over a dielectric communication path;

said sensor including a radioactive emission sensor such that the tracking signal corresponds to radioactive emissions originating from a movable component of the meter, wherein the radioactive emissions are continuously received by the sensor during movement of the movable component, wherein transitions of the movable component between a minimum distance from the sensor and a maximum distance from the sensor correspond to respective maximum and minimum values in radioactive emission strength and respective maximum and minimum amplitudes of the periodic input signal, wherein the processing module is configured to count revolutions of the movable component based on a period of the periodic input signal, and wherein changes in the period are proportional to a rate of commodity usage by the customer so that a higher rate of commodity consumption corresponds to a shorter period.

2. The reading device of claim 1 wherein the commodity usage tracking signal characterizes use of electricity by the customer of the commodity provider.

3. The reading device of claim 1 wherein the commodity usage tracking signal characterizes use of water by the customer of the commodity provider.

4. The reading device of claim 1 wherein the commodity usage tracking signal characterizes use of natural gas by the customer of the commodity provider.

5. The reading device of claim 1, further including:
a radiation shielding container coupled to the moving component and having surfaces defining an opening, wherein the radioactive isotope is disposed within the radiation shielding container, the opening to direct the radioactive emissions toward the sensor.

* * * * *